United States Patent [19]
Gold

[11] Patent Number: 5,852,400
[45] Date of Patent: Dec. 22, 1998

[54] LIGHT-REFLECTING VAN REAR DOOR DISPLAY

[76] Inventor: Peter Gold, 465 N. Wood Rd., Rockville Centre, N.Y. 11570

[21] Appl. No.: 965,500

[22] Filed: Nov. 6, 1997

[51] Int. Cl.$^6$ ........................................... B60Q 1/26
[52] U.S. Cl. ..................... 340/463; 340/472; 340/468; 362/80; 362/83.3; 362/61
[58] Field of Search ..................................... 340/468, 471, 340/472, 463; 362/61, 80, 83.3, 252, 253, 254; 116/28 R

[56] References Cited

U.S. PATENT DOCUMENTS 5,751,212   5/1998   Findley .................................. 340/468

Primary Examiner—Jeffery A. Hofsass
Assistant Examiner—Julie B. Lien
Attorney, Agent, or Firm—Myron Amer PC

[57] ABSTRACT

A van rear door light display having reflectors for impinging light from headlights of approaching traffic, which reflectors are positioned rearwardly when the doors are opened, as when the van is loaded and unloaded, and are strategically at different heights on the edges of the doors to obviate contact therebetween when the doors are closed.

1 Claim, 1 Drawing Sheet

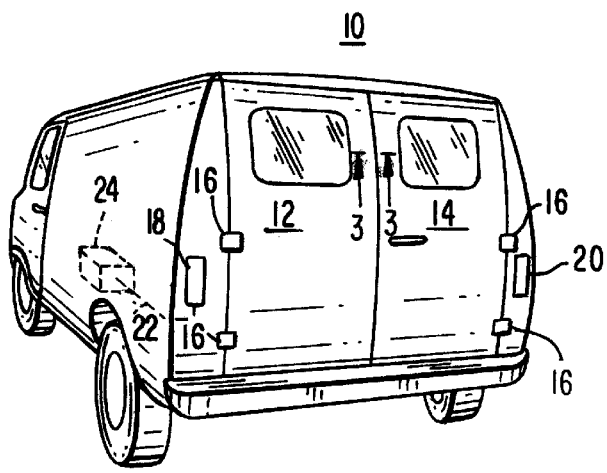
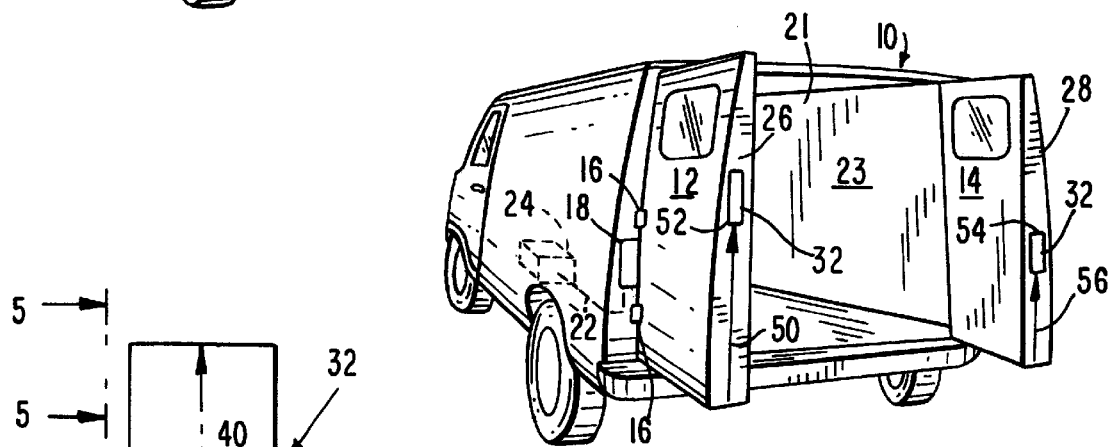
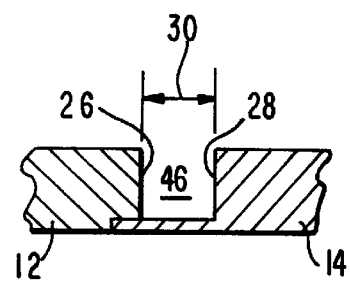
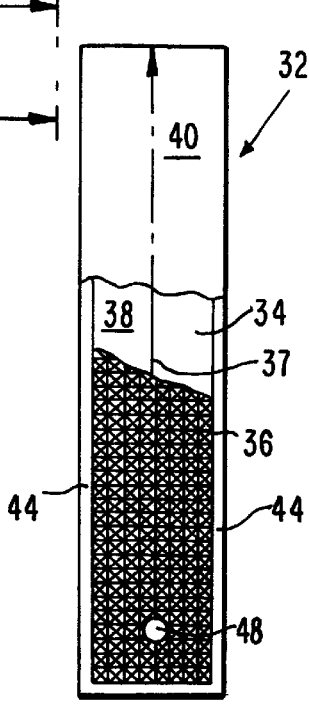
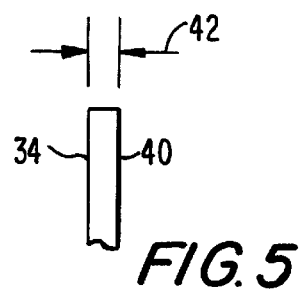

LIGHT-REFLECTING VAN REAR DOOR DISPLAY

The present invention relates generally to improvements for a rearwardly light-transmitting light display for van rear doors, the improvements, more particularly, intensifying the level of the transmitted light so that it is more readily discernible to motorists approaching the van from the rear.

BACKGROUND OF THE INVENTION

Access to the cargo space of a van to enable loading and unloading is, of course, through open doors which in turn unavoidably block the view of the traditionally located tail lights to approaching motorists and create a potential safety hazard. Solutions to this problem are the focus of my prior U.S. Pat. No. 5,523,926 for "Industrial Van" issued on Jun. 4, 1996, U.S. Pat. No. 5,668,530 for "Van Rear Three-Light Display" on Sep. 16, 1997, U.S. Pat. No. 5,560,702 for "Van Rear Light Display" issued on Oct. 1, 1996, and U.S. Pat. No. 5,613,755 for "Rear Door Van Lights" issued on Mar. 25, 1997, as well as in my U.S. pending patent applications Ser. No. 08/751,974 for "Aftermarket Improvements for an Industrial Van" filed on Nov. 19, 1996 and Ser. No. 08/758,677 for "Rear Van Door Triad Lights" filed on Dec. 2, 1996.

The optimum light signal to an approaching motorist is an illuminated light bulb which, however, requires an electrical connection to the van battery. The use, instead, of a luminous-surfaced adhesive strip reflects rearwardly light from the headlights of the approaching motorist impinging on the luminous surface, but the intensity of the level of the reflected light, while adequate for the purposes intended, is not optimum.

SUMMARY OF THE INVENTION

Broadly, it is an object of the present invention to provide a van rear door light display overcoming the foregoing and other shortcomings of the prior art, in that the rearwardly reflected light is of an increased level of intensity.

More particularly, it is an object to intensify the level of the reflected light using reflectors which, even in a nominal size, require proper location on the van left and right doors, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

BRIEF DESCRIPTION OF THE SEVERAL VIEWS OF THE DRAWING(S)

FIGS. 1 and 2 are each rear perspective views of a van with its rear doors in a closed (FIG. 1) and opened (FIG. 2) condition, in which FIG. 2 there is illustrated a rearwardly light-reflecting display in accordance with the present invention;

FIG. 3 is a partial cross sectional view, in slightly enlarged scale, as taken along lines 3—3 of FIG. 1 illustrating the clearance between the closed doors of FIG. 1 in which the within inventive light-reflecting display is disposed;

FIG. 4 is an isolated front elevational view of the reflector component of the light-reflecting display depicted in FIG. 2; and FIG. 5 is a view of the reflector of FIG. 4 as seen in the direction of line 5—5 of FIG. 4.

DETAILED DESCRIPTION OF THE INVENTION

The van 10 of FIGS. 1 and 2 is of the type having rear doors hinged, as on hinges 16 and 18, positioned on the left, at 12, and on the right, at 14, as a closure for the van rear opening as illustrated in FIG. 1, and as illustrated in FIG. 1, providing an access opening 21 into the van cargo/passenger area 22. When open as when the van 10 is loaded and unloaded, the doors 12 and 14 obscure to an approaching motorist the left and right taillights 18 and 20 that are connected by a conductor 22 to the battery 24, thus rendering ineffective the illumination of the taillights 18 and 20 from achieving the end purposes intended for these lights.

While illumination is understood to be the light source of maximum visibility, it has been found in practice that an optimum extent of rearwardly reflected light also has significant utility to contribute to safer loading and unloading of the parked van 10 during the evening or at other times of diminished ambient light conditions, provided that the reflected light, from the headlights of an approaching motorist, emanates from a reflector rather than merely from a luminous adhesive paper or plastic strip as are typically used as bumper stickers or the like, all as will be better understood as the description proceeds.

As shown in FIG. 3, the closed doors 12 and 14 bound a clearance or compartment 46 between door facing end panels 26 and 28 of a width 30, as dictated by the placement of a locking mechanism (not shown), rubber weather barrier insulation means (also not shown), and like requirements.

As shown in FIGS. 4 and 5, the within rearwardly light-reflecting van rear door display of FIG. 2 contemplates identical left door and right door reflectors, generally designated 32, of a well known construction and well known light-reflecting capacity, as exemplified by the "Plastic [glass] Reflective Element" of U.S. Pat. No. 3,525,088 issued to H. Thummel on Jan. 5, 1968. Disclosed or suggested in the '088 patent, the construction used for the reflectors 32 is a base 34, light-reflecting glass means 36 applied or disposed onto the entire length 37 of the base surface 38 which, for simplicity, is shown only partially applied in FIG. 4 so as not to obscure other structural features, and a clear plastic or glass cover 40 of a heights 42 which is disposed in covering relation over the light-reflecting glass means 36 and adhesively attached, as along marginal edges 44, to the reflector base 34.

Since, however, the total of the two heights 42 of the reflectors 32 is to be understood to be approximately or slightly in excess of the width 30 of the clearance 46, the doors 12, 14 in the process of closing must be prevented from causing the reflectors 32 to physically contact each other, even very slightly, and causing breakage of their fragile construction materials. Such undesirable inadvertent contact could even result from wear of mounting screws (not shown) used in an end opening 48 for holding the reflector 32 in place on a cooperating door end panel 26, 28 and as shown in FIG. 4.

In accordance with the present invention, the left reflector 32 is mounted on its supporting door end panel 26 at a height 50 selected to position the bottom edge 52 of the reflector with a clearance of 1–2 inches above the top edge 54 of the right reflector 32 in turn positioned at the lesser distance or height 56 on its supporting door end panel 28.

While the rearwardly light-reflecting van rear door display herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A rearwardly light-reflecting van rear door display comprising identical left door and right door light reflectors each having a base, light-reflecting glass means mounted on said base, and a cover of a transparent construction material and of a selected height disposed in covering relation over said light-reflecting glass means and onto said base, hingedly mounted van left and right doors each having an end door panel remote from a hinged end thereof bounding when in facing relation with each other in a closed position of said doors a clearance of a prescribed width therebetween, said total height of said reflector covers being selected to be approximately the prescribed width of said clearance, and operative positions of said left door and right door reflectors on cooperating respective left door and right door end panels in said clearance therebetween and at different height levels so as to obviate contact of said reflectors with each other in said closed position of said van rear doors, whereby in an open condition of said van rear doors as occurs during loading and unloading said van a headlight of an approaching motorist causes an optimum extent of light to be reflected rearwardly from said reflector light-reflecting glass means to signal the presence of said van to said approaching motorist.

* * * * *